US008619903B2

(12) United States Patent
Schmidt et al.

(10) Patent No.: US 8,619,903 B2
(45) Date of Patent: Dec. 31, 2013

(54) CREST FACTOR REDUCTION FOR A MULTICARRIER-SIGNAL WITH SPECTRALLY SHAPED SINGLE-CARRIER CANCELATION PULSES

(75) Inventors: Georg Schmidt, Laichingen (DE); Johannes Schlee, Ulm (DE)

(73) Assignee: KATHREIN-Werke KG, Rosenheim (DE)

( * ) Notice: Subject to any disclaimer, the term of this patent is extended or adjusted under 35 U.S.C. 154(b) by 229 days.

(21) Appl. No.: 12/904,606

(22) Filed: Oct. 14, 2010

(65) Prior Publication Data

US 2012/0093210 A1    Apr. 19, 2012

(51) Int. Cl.
*H04K 1/02* (2006.01)
*H04B 1/04* (2006.01)
(52) U.S. Cl.
USPC ........................................ 375/296; 455/114.3
(58) Field of Classification Search
USPC ............... 375/295, 296; 455/91, 114.2, 114.3
See application file for complete search history.

(56) References Cited

U.S. PATENT DOCUMENTS

| | | | |
|---|---|---|---|
| 5,710,990 | A | 1/1998 | Long et al. |
| 7,313,373 | B1 | 12/2007 | Laskharian et al. |
| 8,259,846 | B2 | 9/2012 | Liang et al. |
| 8,265,196 | B2 * | 9/2012 | Gandhi ........................ 375/296 |
| 2002/0101936 | A1 | 8/2002 | Wright et al. |
| 2004/0052314 | A1 * | 3/2004 | Copeland ...................... 375/296 |
| 2005/0008094 | A1 * | 1/2005 | Kramer et al. ................ 375/296 |
| 2006/0029158 | A1 * | 2/2006 | Lipka et al. ................... 375/300 |

FOREIGN PATENT DOCUMENTS

WO    2004/019540    3/2004

OTHER PUBLICATIONS

Kim et al, "Doherty Feed-Forward Amplifier Performance Using a Novel Crest Factor Reduction Technique" IEEE Microwave & Wireless Components Letters, vol. 17 No. 1, Jan. 2007, 3 pages.
Kim et al, "An Efficient Crest Factor Reduction Technique for Wideband Applications", Analog Integr. Cir. Sig. Process (2007) 51, 8 pages.
Hemphill et al., "Peak Cancellation Crest Factor Reduction Reference Design", XILINX Application Note (XAPP 1033), Dec. 5, 2007, 32 pages.
Kim et al, "Digital Predistortion Linearization and Crest Factor Reduction for Wideband Applications" Thesis document, Dec. 8, 2006, 64 pages (Part 1).
Kim et al, "Digital Predistortion Linearization and Crest Factor Reduction for Wideband Applications" Thesis document, Dec. 8, 2006, 64 pages (Part 2).

* cited by examiner

*Primary Examiner* — Sam K Ahn
*Assistant Examiner* — Vineeta Panwalkar
(74) *Attorney, Agent, or Firm* — Stephen H. Eland; Dann, Dorfman, Herrell & Skillman

(57) ABSTRACT

A method for crest factor reduction of a multi-carrier signal is disclosed. The multi-carrier signal comprises a plurality of single-carrier signals, each single-carrier signal having signal-specific spectral properties. The method comprises identifying a peak in the multi-carrier signal and a time of occurrence of the peak and generating a plurality of cancellation pulses depending on the time of occurrence of the peak. A particular cancellation pulse of the plurality of cancellation pulses is associated with a particular single-carrier signal and cancellation pulse-specific spectral properties of the particular cancellation pulse substantially match the signal-specific spectral properties of the associated particular single-carrier signal. The method further comprises combining the plurality of cancellation pulses to form a combined cancellation pulse and applying the combined cancellation pulse to the multi-carrier signal to reduce the peak. A corresponding circuit and corresponding computer program products useable during manufacture and operation are also disclosed.

13 Claims, 8 Drawing Sheets

CREST FACTOR REDUCTION FOR A MULTICARRIER-SIGNAL WITH SPECTRALLY SHAPED SINGLE-CARRIER CANCELATION PULSES

CROSS-REFERENCE TO RELATED APPLICATIONS

This application is related to U.S. patent application Ser. No. 12/904,538 entitled "Crest factor reduction method and circuit for a multi-carrier signal" filed currently herewith. The entire contents of the forgoing application are incorporated herein by reference.

FIELD OF THE INVENTION

The field of the invention relates to a method for crest factor reduction of a multi-carrier signal. The field of the invention also relates to a crest factor reduction circuit for a multi-carrier signal. The field of the invention further relates to a computer program product enabling a foundry to carry out the manufacture of a chip comprising the crest factor reduction circuit, and to a computer program product enabling a processor to execute the method for crest factor reduction of a multi-carrier signal.

BACKGROUND OF THE INVENTION

When transmitting radio signals, a transmitter for the radio signal usually comprises a power amplifier. The power amplifier can be operated in a number of different modes of operation, such as a class A amplifier, a class B amplifier, a class AB amplifier, a class C amplifier, and a class D amplifier. The choice of one of these classes as the mode of operation for the power amplifier is usually a compromise between signal distortion and power efficiency. For example, a class A amplifier offers a very low degree of signal distortion, but has poor power efficiency. A class D amplifier, on the other hand, exhibits a very good power efficiency but distorts the input signal to a sequence of digital pulses having the same amplitude.

In the domain of wireless mobile communications such as used in cellular communication networks, another factor comes into play: the spectrum useable for wireless communications is a limited resource which needs to be exploited more and more efficiently with the increasing demand for wireless communication and applications. This need for efficient spectrum utilization was one of the driving forces for the development of new standards for wireless communication, such as the family of standards for mobile communications commonly termed "third generation", or 3G. The 3G standards family includes UMTS (Universal Mobile Communication System), CDMA 2000 (Code Division Multiple Access), DECT (Digital Enhanced Cordless Telecommunications), and WiMAX (Worldwide Interoperability for Micro wave Access) standards, among others. These third generation standards, while offering an efficient utilization of spectrum resources than older wireless communications standards, make heavy demands on the linearity of the equipment used to process the signal, i.e. transmitters and receivers. For the transmitter this typically means that the power amplifier needs to operate in the linear region.

The linear region of the power amplifier has to be large enough to receive the dynamic range of the telecommunications signal to be amplified. A power amplifier with a large linear range of operation typically is more expensive and consumes more power than a power amplifier with a smaller linear range of operation. The required size of the linear range is, among others, determined by a property of an input signal called "crest factor". The crest factor is the ratio between a maximum peak and an average value of a signal. Faced with a signal with a high crest factor the power amplifier needs to be designed for the maximum peak value, even though the maximum peak value may occur very scarcely, only.

The crest factor reduction of digital radio signals is desirable in third generation cellular network base station radio front end equipment in order to achieve high power amplifier efficiency. Generally, the higher the crest factor, the more back-off is necessary when designing an analog power amplifier. A high back-off results in a reduced efficiency for most state-of-the art power amplifier designs.

For a standard transmitter such as in a remote radio head (RRH), the crest factor reduction may be applied directly to the multi-carrier signal prior to feeding the multi-carrier signal into the power amplifier.

Several state-of-the art approaches and reference designs exist for reducing the crest factor of the multi-carrier signals. An international patent application published under the international publication number WO 2004/019540 A2 discloses a crest factor reduction processor for wireless communications. A plurality of peak detection and cancellation circuits is arranged in a sequence in the WO '540. This serves to reduce peaks that, as a result of "peak regrowth", are caused at sample points near to a reduced peak point.

U.S. Pat. No. 7,313,373 B1 discloses a crest factor reduction for use in a multi-band transmitter capable of transmitting a plurality of component signals that are respectively associated with dedicated sub-bands. The component signals are superposed and the superposed signal is processed to form a clipping noise error signal. The clipping noise error signal is applied to the component signals using a least square estimation to project clipping noise error onto the sub-bands.

A number of scientific papers by Wan-Jong Kim also address crest factor reduction techniques. These articles are:
IEEE Microwave and wireless components letters, vol. 17, no. 1, January 2007: "Doherty feed-forward amplifier performance using a novel crest factor reduction technique"
Analog Integrated Circuits and Signal Processing (2007) 150: 19-26: "An efficient crest factor reduction technique for wide band applications"
Thesis (Ph.D)—School of Engineering Science, Simon Fraser University, fall 2006: "Digital pre-distortion linearization and crest factor reduction for wide band applications".

An application note by Xilinx, Inc. entitled "Peak cancellation crest factor reduction reference design", identification no. XAPP 1033 (v 1.0 Dec. 5, 2007), describes a peak cancellation method based on a generation of a cancellation pulses. The peak cancellation is achieved by subtracting spectrally shaped pulses from the signal peaks that exceed a specified threshold. The cancellation pulses are designed to have a spectrum that matches that of the high-crest factor input signal and therefore introduce only negligible out-of-band interference. For multi-carrier configurations, the Xilinx application note proposes the creation of a composite multi-band filter. Each of the cancellation pulses is filtered by the composite multi-band filter and accordingly occupies portions of the spectrum that correspond to the transmission band(s) of the multi-band filter. In active antennas with a distributed transceiver architecture, the CFR arrangement proposed by Xilinx would have to be implemented in each transmitter path because that is where the combining of the single-carrier signals to the multi-band signal occurs.

SUMMARY OF THE INVENTION

This disclosure provides for a method for crest factor reduction of a multi-carrier signal comprising a plurality of single-carrier signals. Each single-carrier signal of the plurality of single-carrier signals has signal-specific spectral properties. The crest factor reduction method comprises identifying a peak in the multi-carrier signal and a time of occurrence of the peak. The crest factor reduction method further comprises generating a plurality of cancellation pulses depending on the time of occurrence of the peak, wherein a particular cancellation pulse of the plurality of cancellation pulses is associated with a particular single-carrier signal of the plurality of single-carrier signals. Cancellation pulse-specific spectral properties of the particular cancellation pulse substantially match the signal-specific spectral properties of the associated particular single-carrier signal. The method for crest factor reduction also comprises combining the plurality of cancellation pulses to form a combined cancellation pulse and applying the combined cancellation pulse to the multi-carrier signal to reduce the peak.

The proposed crest factor reduction method addresses the fact that different ones of the plurality of single-carrier signals may require different processing in the context of crest factor reduction, in particular (but not exclusively) single-carrier signals operating under different ones of the wireless communication standards such as GSM and UMTS. The crest factor reduction method according to the teachings disclosed herein causes not only a single cancellation pulse to be generated, but a plurality of cancellation pulses. Each one of the plurality of cancellation pulses is dedicated for canceling a peak contribution in a corresponding one of the plurality of single-carrier signals. Parameters of the plurality of cancellation pulses such as amplitude, shape, phase, and timing, can be adjusted on a per-single-carrier basis. The proposed crest factor reduction method exploits the fact that the plurality of single-carrier signals making up the multi-carrier signal have, by and large, distinct spectra. In other words, the single-carrier signals occupy distinct and (mostly) non-overlapping frequency ranges. By limiting a spectrum of a cancellation pulse substantially to the frequency range occupied by the corresponding single-carrier signal, a peak cancellation action or effect of the crest factor reduction method affecting the frequency range of the corresponding single-carrier signal can be adjusted individually. The method for crest factor reduction according to the teachings disclosed herein, enables treating different carriers in a multi-carrier signal differently with respect to requirements on the signal quality (e.g. error vector magnitude (EVM)).

For the purposes of the matching between the cancellation pulse-specific spectral properties and the signal-specific spectral properties, it may be sufficient that the cancellation pulse-specific spectral property is non-zero somewhere in the frequency range occupied by the corresponding one of the plurality of single-carrier signals, and substantially zero outside the frequency range. In other words, it may not be required that the cancellation pulse-specific spectral properties have a shape and/or frequency coverage similar to the shape and/or frequency coverage of the single-specific spectral properties. The cancellation pulse-specific spectral properties are mainly intended to make a distinction in the frequency domain with respect to the plurality of single-carrier signals.

In one aspect of the teachings disclosed herein, the method may further comprise weighting the plurality of cancellation pulses with a plurality of weighting factors prior to combining the plurality of cancellation pulses. The plurality of weighting factors is one option of several possible options for implementing a single-carrier specific cancellation.

In a further aspect of the teachings according to this disclosure the method may further comprise adjusting the weighting factors depending on a plurality of variable distortion thresholds for the plurality of single-carrier signals. Each one of the variable distortion thresholds of the plurality of variable distortion thresholds defines an allowable range of operation for one of the plurality of single-carrier signals with respect to distortions. The crest factor reduction method can thus react to changing requirements and conditions affecting the plurality of single-carrier signals. In addition to the plurality of variable distortion thresholds, instantaneous crest factor values of the plurality of single-carrier signals could also be taken into account. A single-carrier signal having a high crest factor may require a stronger crest factor reduction, where otherwise a desired crest factor for the multi-carrier signal may not be achieved. The stronger crest factor reduction applied to the single-carrier signal comes typically at a cost of a stronger signal distortion for this single-carrier signal. In order to avoid too strong signal distortions, a plurality of variable distortion thresholds could be bounded by pre-defined upper limits.

In a further aspect of the teachings disclosed herein, the adjusting may comprise an optimization of the weighting factors based on evaluating and minimizing a crest factor reduction distortion of the multi-carrier signal caused by the crest factor reduction. The crest factor reduction distortion may be some kind of metric representing signal distortions in the plurality of single-carrier signals that are caused by the crest factor reduction. As mentioned above, the crest factor reduction method functions by applying the combined cancellation pulse to the multi-carrier signal. The combined cancellation pulse is formed by combining the plurality of cancellation pulses which are individually assigned to one of the plurality of single-carrier signals via their matching spectral properties. For a particular single-carrier signal the corresponding cancellation pulse is a good estimate for the distortion of this single-carrier signal which is caused by the crest factor reduction. In the alternative, other methods for determining the crest factor reduction distortion may be implemented.

In an aspect of the teachings disclosed herein, the optimisation may be a convex optimisation. The convex optimisation deals with the problem of minimising convex functions. The plurality of weighting factors defines a vector space and may be used as an argument of a convex, real valued function. Solving the optimisation problem comprises finding a point in the real vector space for which the convex, real-valued function assumes a minimum value for all combinations of weighting factors. The convex optimization may be subject to one or more boundary conditions, such as a plurality of thresholds for a maximal allowable value of the plurality of cancellation pulses.

In one aspect of the crest factor reduction method two or more successive ones of the combined cancellation pulses are generated by two different pulse generators of a crest factor reduction circuit performing the method for crest factor reduction. The second combined cancellation pulse of the two successive combined cancellation pulses can occur rapidly after the first combined cancellation pulse. Providing several pulse generators (at least two), makes a quick succession of cancellation pulses possible. Due to the cancellation pulse-specific spectral properties of the cancellation pulses, one of the cancellation pulses may have a determined duration so that a first one of the pulse generators may still be active when the second one of the two successive cancellation pulses needs to be generated.

In one aspect of the teachings disclosed herein, the identifying of the peak may also produce at least one of a value of a peak amplitude of the peak and a peak phase of the peak. The generating of the plurality of cancellation pulses may depend on at least one of the peak amplitude and the peak phase. Knowing the peak amplitude and/or the peak phase allows a more exact generation and application of the plurality of cancellation pulses and/or the combined cancellation pulse.

The disclosure also teaches a crest factor reduction circuit for a multi-carrier signal comprising a plurality of single-carrier signals, wherein each single-carrier signal of the plurality of single-carrier signals has signal-specific spectral properties. The crest factor reduction circuit comprises a peak detector, a multi-pulse generator, and a pulse injector. The peak detector is usable for identifying a peak in the multi-carrier signal and a time of occurrence of the peak. The multi-pulse generator is usable for generating a plurality of cancellation pulses depending on the time of occurrence. The multi-pulse generator comprises a plurality of pulse generators and a cancellation pulse combiner connected to a pulse output of the plurality of pulse generators and adapted to form a combined cancellation pulse. A particular pulse generator of the plurality of pulse generators is associated with a particular single-carrier signal of the plurality of single-carrier signals. Cancellation-pulse specific spectral properties of a cancellation pulse generated by the particular pulse generator substantially match the single-specific spectral properties of the associated particular single-carrier signal. The pulse injector is usable for injecting the combined cancellation pulse to the multi-carrier signal.

The internal structure of the multi-pulse generator offers a degree of control over the generation of the single-carrier-specific cancellation pulses and over the manner in which the single-carrier-specific cancellation pulses are combined to form the combined cancellation pulse. The assignment of the plurality of pulse generators to the plurality of single-carrier signals provides flexibility in the generation and injection of the cancellation pulses.

In one aspect of the teachings disclosed herein, the multi-pulse generator may further comprise a weighting unit interposed between the plurality of pulse generators and a cancellation pulse combiner. The weighting unit is adapted to weight the plurality of cancellation pulses with a plurality of weighing factors prior to the combining of the plurality of cancellation pulses.

In a further aspect of the disclosed teachings the crest factor reduction circuit may further comprise an adaptive adjuster adapted to adjust the weighting factors depending on a plurality of variable distortion thresholds for the plurality of single-carrier signals. The adaptive adjustor enables the crest factor reduction circuit to change the crest factor reduction for example by varying the weighting factors. The crest factor reduction may thus take into account that a tolerance of the single-carrier signals towards the injection of the cancellation pulses may vary over time and that at different instance a different one of the plurality of single-carrier signals may be best suited for assuming a major part in the crest factor reduction.

In a further aspect of the crest factor reduction circuit, the adaptive adjustor may be adapted to perform an optimization of the weighting factors based on evaluating and minimizing a crest factor reduction distortion of the multi-carrier signal caused by the crest factor reduction. This evaluation and minimisation of the crest factor reduction distortion enables the maintenance of the crest factor reduction distortion within acceptable bounds.

In one aspect of the teachings disclosed herein, the crest factor reduction circuit may comprise a plurality of the multi-pulse generators. The plurality of the multi-pulse generators may be adapted to generate a plurality of combined cancellation pulses in a staggered succession. A crest factor reduction that is based on the injection of cancellation pulses may require the generation of several cancellation pulses in a relatively rapid succession.

In one aspect of the teachings disclosed herein, the identifying of the peak may produce at least one of a value of a peak amplitude of the peak and a peak phase of the peak. The multi-pulse generator may be adapted to generate the plurality of cancellation pulses depending on at least one of the peak amplitude and the peak phase.

The disclosure also provides for a mobile communications transmitter comprising the crest factor reduction circuit as described above and to a mobile communications base station comprising a crest factor reduction circuit as described above.

The disclosure also teaches a computer program product, comprising a non-transitory computer-usable medium, such as but not limited to solid-state memory or a removable storage medium, having control logic stored therein for causing a computer to manufacture a crest factor reduction circuit comprising:

a peak detector for identifying a peak in the multi-carrier signal and a time of occurrence of the peak;

a multi-pulse generator for generating a plurality of cancellation pulses depending on the time of occurrence, the multi-pulse generator comprising a plurality of pulse generators and cancellation pulse combiner connected to a pulse output of the plurality of pulse generators and adapted to form a combined cancellation pulse, wherein a particular pulse generator of the plurality of pulse generators is associated with a particular single-carrier signal of the plurality of single-carrier signals and wherein cancellation pulse-specific spectral properties of cancellation pulse generated by the particular pulse generator substantially match the single-specific spectral properties of the associate particular single-carrier signal, and a pulse injector for injection the combined cancellation pulse to the multi-carrier signal.

In a further aspect of the disclosure, a computer program product is disclosed which comprises a non-transitory computer-usable medium, such as but not limited to solid-state memory or a removable storage medium, having control logic stored therein for causing a processor for carrying out a method for crest factor reduction comprising:

identifying a peak in the multi-carrier signal and time of occurrence of the peak;

generating a plurality of cancellation pulses depending on the time of occurrence of the peak, wherein a particular cancellation pulse of the plurality of cancellation pulses is associated with the particular single-carrier signal of the plurality of single-carrier signals and wherein cancellation pulse-specific spectral properties of the particular cancellation pulse substantially match the single-specific spectral properties of the associated particular single-carrier signal;

combining the plurality of cancellation pulses to form a combined cancellation pulse; and applying the combined cancellation pulse to the multi-carrier signal to reduce the peak.

DETAILED DESCRIPTION OF THE INVENTION

The invention will now be described on the basis of the drawings. It will be understood that the embodiments and aspects described herein are only examples and do not limit the protective scope of the claims in any way. The invention is defined by the claims and their equivalents. It will also be understood that features of one aspect can be combined with features of a different aspect.

Figure 1:
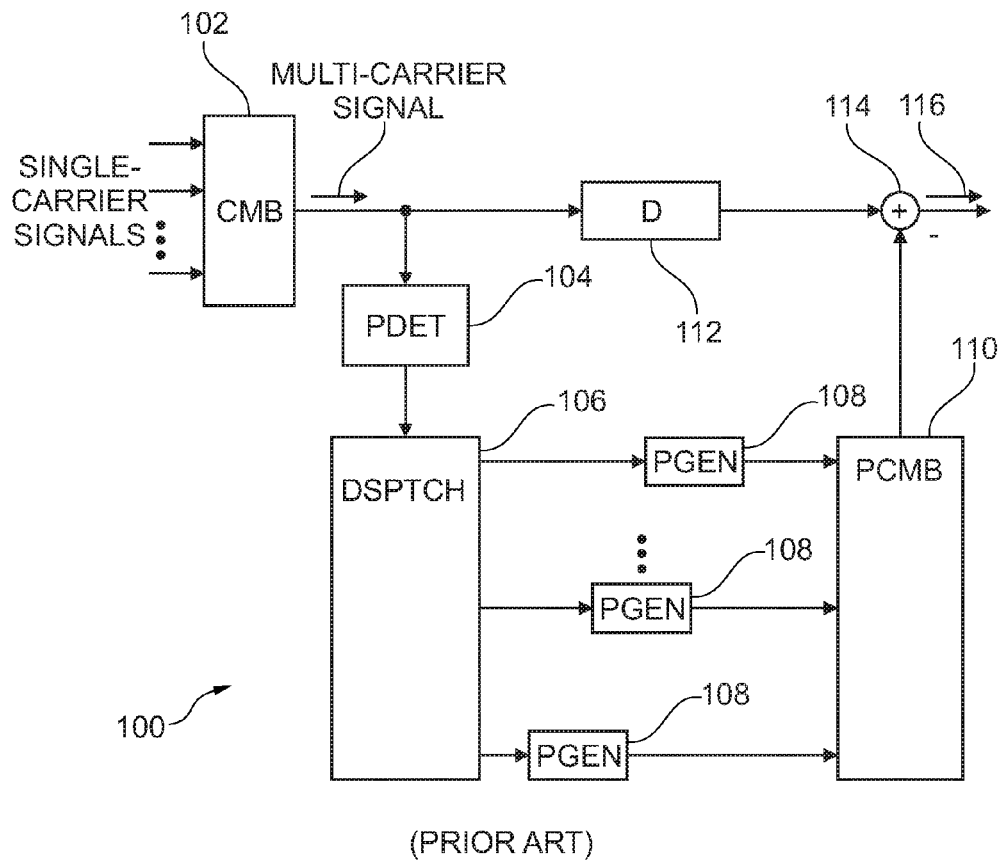
FIG. 1 shows a schematic block diagram of a crest factor reduction circuit according to the prior art.

FIG. 1 shows a schematic block diagram of a crest factor reduction circuit according to the prior art. The crest factor reduction circuit acts on a multi-carrier signal which is generated by combining a plurality of single-carrier signals by means of a combiner 102. Within the crest factor reduction circuit 100, the multi-carrier signal is split and distributed to two paths. The multi-carrier signal per se is sent over a first path which leaves the multi-carrier signal substantially unmodified except for the introduction of a delay by means of a delay element 112 ("D"). The first signal path ends at a signal adder 114. A second signal paths comprises a peak detector 104 ("PDET"), a dispatcher 106 ("DSPTCH"), a plurality of pulse generators 108 ("PGEN"), and a pulse combiner 110 ("PCMB").

This second signal path basically has the task of detecting peaks in the multi-carrier signal and of generating cancellation pulses on the basis of data provided by the detecting of peaks in the multi-carrier signal. The peaks in the multi-carrier signal are first detected by the pulse detector 104, which, for example, detects intervals in the multi-carrier signal exceeding a predefined threshold and determines the maximum signal amplitude within these intervals. When a pulse is detected, the pulse dispatcher 106 selects an unoccupied resource from the plurality of pulse generators 108. The plurality of pulse generators 108 may be regarded as a battery of pulse generators 108. The pulse dispatcher 106 uses the selected pulse generator 108 to generate a suitable pulse whose spectral envelope is typically chosen to largely coincide with a (potentially fragmented) spectral envelope of the multi-carrier signal. The plurality of pulse generators 108 is needed because it may be necessary to generate several cancellation pulses in a relatively quick succession. The pulse combiner 110 may also comprise a pulse scaler for adjusting the amplitude and phase of the pulse generator to achieve maximum peak cancellation at the point indicated by the pulse detector 104. The pulse detector 104 may provide additional information about the detected peak to the pulse scaler within the pulse combiner 110. A pulse combiner 110 then adds up the signals of all currently active pulse generators 108 and combines them into a single signal which is subtracted 8:01 from the delayed multi-carrier signal at signal adder 114. The crest factor reduction circuit 100 outputs a crest factor reduced multi-carrier signal 116.

Figure 2:
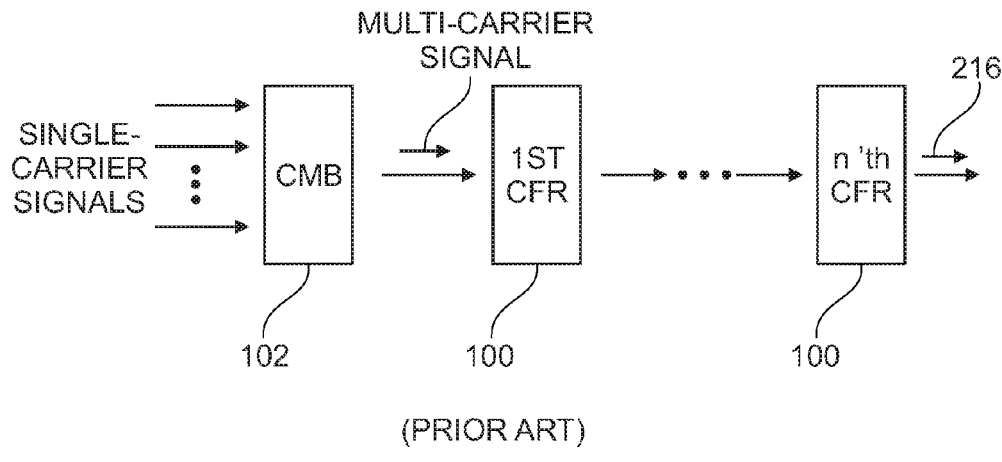
FIG. 2 shows a cascaded crest factor reduction arrangement.

To achieve a desired crest factor, it may be necessary to apply the crest factor reduction block depicted in FIG. 1 iteratively several times. This is commonly implemented by cascading several crest factor reduction blocks as depicted in FIG. 2. FIG. 2 shows the combiner 102 which receives a plurality of single-carrier signals and combines them to form one single multi-carrier signal. The multi-carrier signal is forwarded to a first crest factor reduction unit 100, the details of which have been shown and described in FIG. 1. The crest factor reduced multi-carrier signal output by the first crest factor reduction unit 100 undergoes further crest factor reduction stages until a highly crest factor-reduced signal 216 is output by an n'th crest factor reduction circuit 100.

Figure 3:
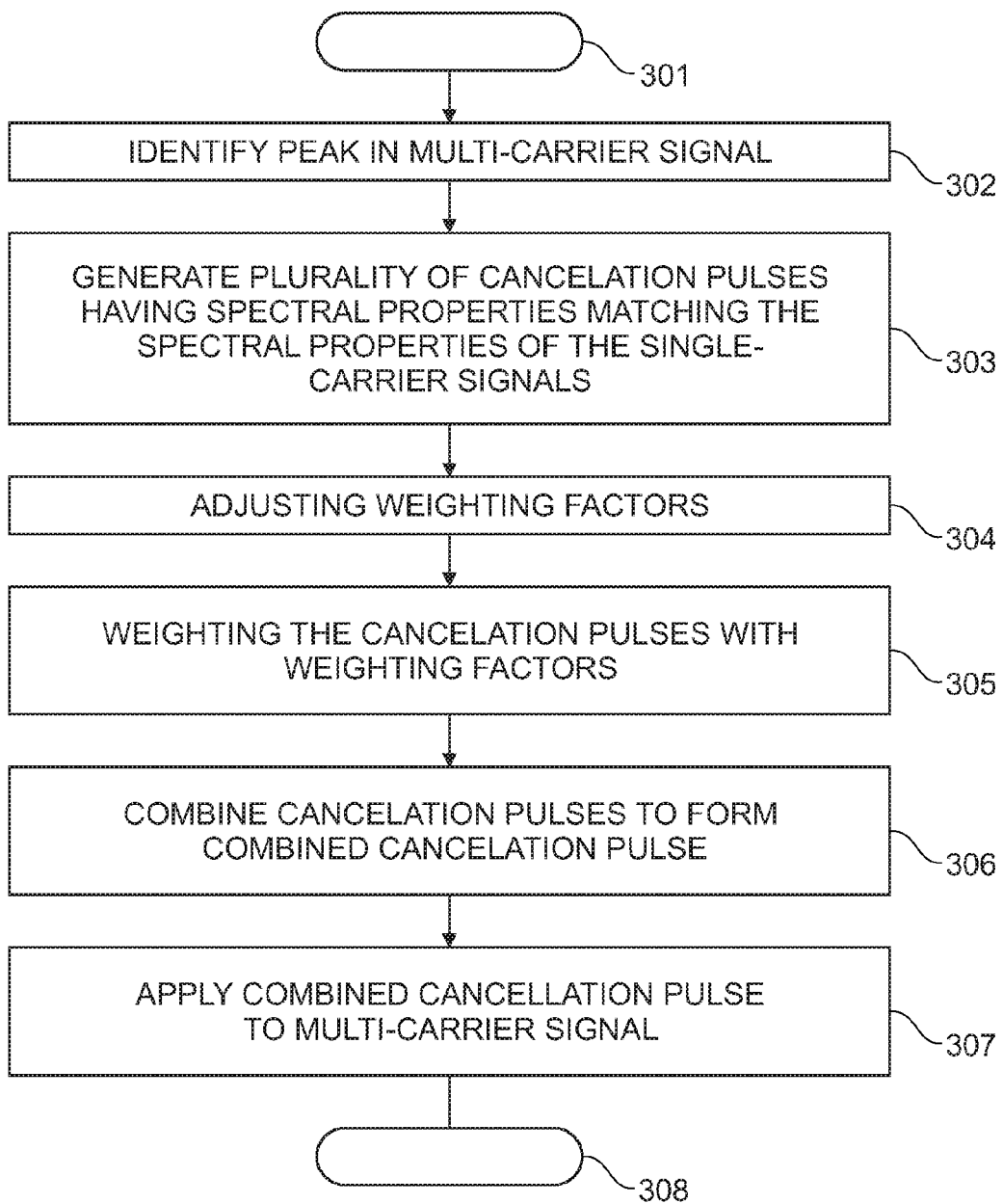
FIG. 3 shows a schematic flow chart of a method for crest factor reduction according to the teachings disclosed herein.

FIG. 3 shows an exemplary flow chart of a method for crest factor reduction according to the teachings disclosed herein. After the start of the method at 301, an action 302 is performed to identify a peak in the multi-carrier signal. Identifying the peak in the multi-carrier signal typically comprises deciding on whether the multi-carrier signal actually has a peak at a particular instant or within a particular time interval, and determining a time of occurrence of the peak.

It is known that the multi-carrier signal is composed of a plurality of single-carrier signals. Typically, the spectral properties of the plurality of single-carrier signals is also known, at least with respect to allowable ranges of the spectra of the plurality of single-carrier signals. At 303 this knowledge is used to generate a plurality of cancellation pulses having spectral properties which substantially match the spectral properties of the single-carrier signals. The generation of the cancellation pulses typically also takes into account the time of occurrence of the peak so that the cancellation pulses and the peak may eliminate each other during a subsequent action of applying the cancellation pulses to the multi-carrier signal, as will be described later. Typically, one cancellation pulse will be generated per single-carrier signal, even if a particular single-carrier signal only makes a small contribution to the peak. When speaking of the cancellation pulse-specific spectral properties substantially matching the signal-specific spectral properties of the associated particular single-carrier signal, it is meant that a spectrum of the cancellation pulse is non-zero (somewhere) within a frequency range reserved for the single-carrier signal. Outside the frequency range the spectrum of the cancellation pulse is ideally substantially zero.

At 304 weighting factors are adjusted which will be used for weighting the cancellation pulses at 305. This adjustment of the weighting factors and the subsequent weighting of the cancellation pulses is useful for reacting to varying operating conditions for the crest factor reduction method and/or varying quality of the single-carrier signals and can be dynamically adjusted. For example, one of the single-carrier signals may be idle at a given time. The adjustment process for the weighting factors may now either disregard this single-carrier signal for the purposes of crest factor reduction (because there is no signal to which the cancellation pulse could be applied) and set the corresponding weighting factor to zero. In the alternative, the weighting factor adjustment process could assign a relatively high value to the weighting factor corresponding to the idle single-carrier signal (because the corresponding channel is idle anyway so that no payload signal is disturbed when a large cancellation pulse is injected to the zero-valued single-carrier signal).

The plurality of cancellation pulses is then combined to form a combined cancellation pulse at 306. At 307 the combined cancellation pulse is applied to the multi-carrier signal. The combined cancellation pulse is composed of the plurality of cancellation pulses which are assigned to the plurality of single-carrier signals, respectively. The cancellation action 307 can be flexibly distributed to the single-carrier signal components within the multi-carrier signal via the spectral properties matching between the single-carrier signals and the cancellation pulses. The method ends at 308. In a typical implementation, the method is repeated in a periodical manner, such as once per sampling point of the single-carrier signals, or once per time interval.

Figure 4:
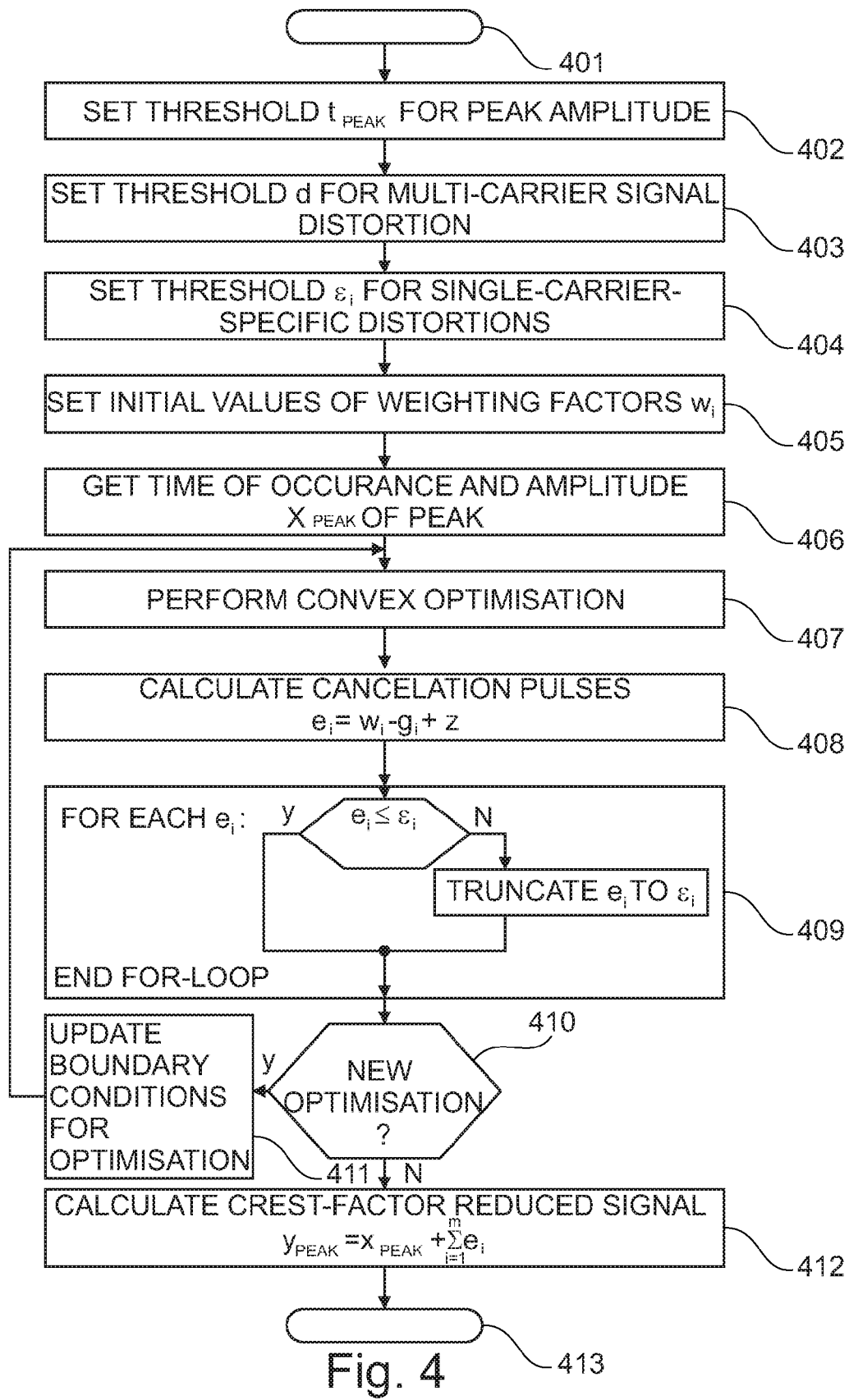
FIG. 4 shows a schematic flow chart illustrating an aspect of the crest factor reduction method according to the teachings disclosed herein.

FIG. 4 shows an exemplary flow chart illustrating some aspects of the crest factor reduction method disclosed herein. After a start at 401 the threshold $t_{peak}$ for the peak amplitude is set at 402. The threshold $t_{peak}$ is used to determine whether an instantaneous signal value qualifies as a peak in the multi-carrier signal that should be canceled in order to reduce the crest factor of the multi-carrier signal. Another threshold value d for the multi-carrier signal distortion is set at 403. The threshold d value defines a limit for the maximum allowable distortion applied to the multi-carrier signal that is caused by the crest factor reduction. At 404, a plurality of threshold values $\epsilon_i$ for single-carrier-specific distortions are set to predefined values. The threshold values $\epsilon_i$ take into account ranges of allowable distortions for the plurality of single-carrier signals. The threshold values $\epsilon_i$ may be variable and thus be modified by an instance that supervises which of the plurality of single-carrier signals can currently support which level of distortion. At 405 initial values are assigned to the weighting factors $w_i$. The initial values of the weighting factors are used as a starting point for a subsequent optimization of the weighting factors. The preceding actions 402 to 405 may be regarded as preparatory actions.

Each time a peak is detected, the time of occurrence and sometimes also the amplitude $x_{peak}$ of the peak are retrieved at 406. At 407, an optimization on the weighting factors $w_i$ is performed. Within the optimization, the weighting factors $w_i$ for the individual cancellation pulses are typically chosen with respect to the several requirements regarding the signal quality of the single-carriers. The weighting factors are adapted and optimized during run time in order to minimize some objective function, with the constraint that the multi-carrier signal amplitude and the detected peak lies below a predefined limit $t_{peak}$, which basically determines the target crest factor. During the optimisation process, the requirements on the signal quality can be taken into account by formulating additional constraints for the optimisation process. A suitable objective function could e.g. the signal distortion, that is, the norm of the overall cancellation signal. It is conceivable to use different norms, e.g., the $L_2$-norm or the $L_\infty$-norm.

On the basis of the weighting factors $w_i$ determined by the optimisation, the cancellation pulses are calculated at 408. The formula for calculating the cancellation pulse $e_i$ is:

$$e_i = w_i \cdot g_i + z.$$

The variable $g_i$ represents a generic pulse for a single-carrier signal i. The variable z represents the signal distortion due to cancellation pulses which have been activated in the past, but are still active. Hence, the parameter z may be non-zero especially in cases where two cancellation pulses follow each other in relatively quick succession.

If not already done in the context of the optimisation, it may checked whether each of the plurality of cancellation pulses $\epsilon_i$ fulfils the requirement of being smaller than or equal to the plurality of thresholds $\epsilon_i$ for the single-carrier specific distortions at 409. A cancellation pulse $e_i$ may be truncated to $\epsilon_i$ if the cancellation pulse does not fulfill this condition.

At an iteration step 410 it is determined whether a new optimization should be performed. For example, a stop criterion of the optimization may be evaluated. A possible stop criterion could be that the previous iteration of the optimization did not significantly improve the value of the objective function any more. Another possible stop criterion could be that the objective function has reached a value that is regarded as sufficiently close to an optimal solution. A further stop criterion could be whether there is still enough time for performing another optimization. If at 410 it has been decided that a new optimization should be performed, the process continues at 411 where boundary conditions for the optimization are updated, if necessary. From 411 the method loops back to 407 to perform another iteration of the optimization. The method continues at 412 if no new optimization loop should be performed. At 412 the crest factor reduced signal is calculated by means of the formula:

$$y_{peak} = x_{peak} + \Sigma w_i \cdot e_i.$$

The method ends at an action 413. It is possible that no iteration step 410 needs to be performed as there may exist algorithms which find a minimum in a single iteration. This is termed a convex optimization.

With respect to the decision point 410 it should be noted that in an alternative to what is disclosed and illustrated in FIG. 4, it would be conceivable that a new optimization is triggered and that the crest factor reduced signal is calculated, as well.

In this manner, a result of the new optimization will be available for the calculation of the next cancellation pulses. The current calculation pulses can already be calculated and applied to the multi-carrier signal so that the multi-carrier signal is not delayed too much by the crest factor reduction method.

Figure 5:
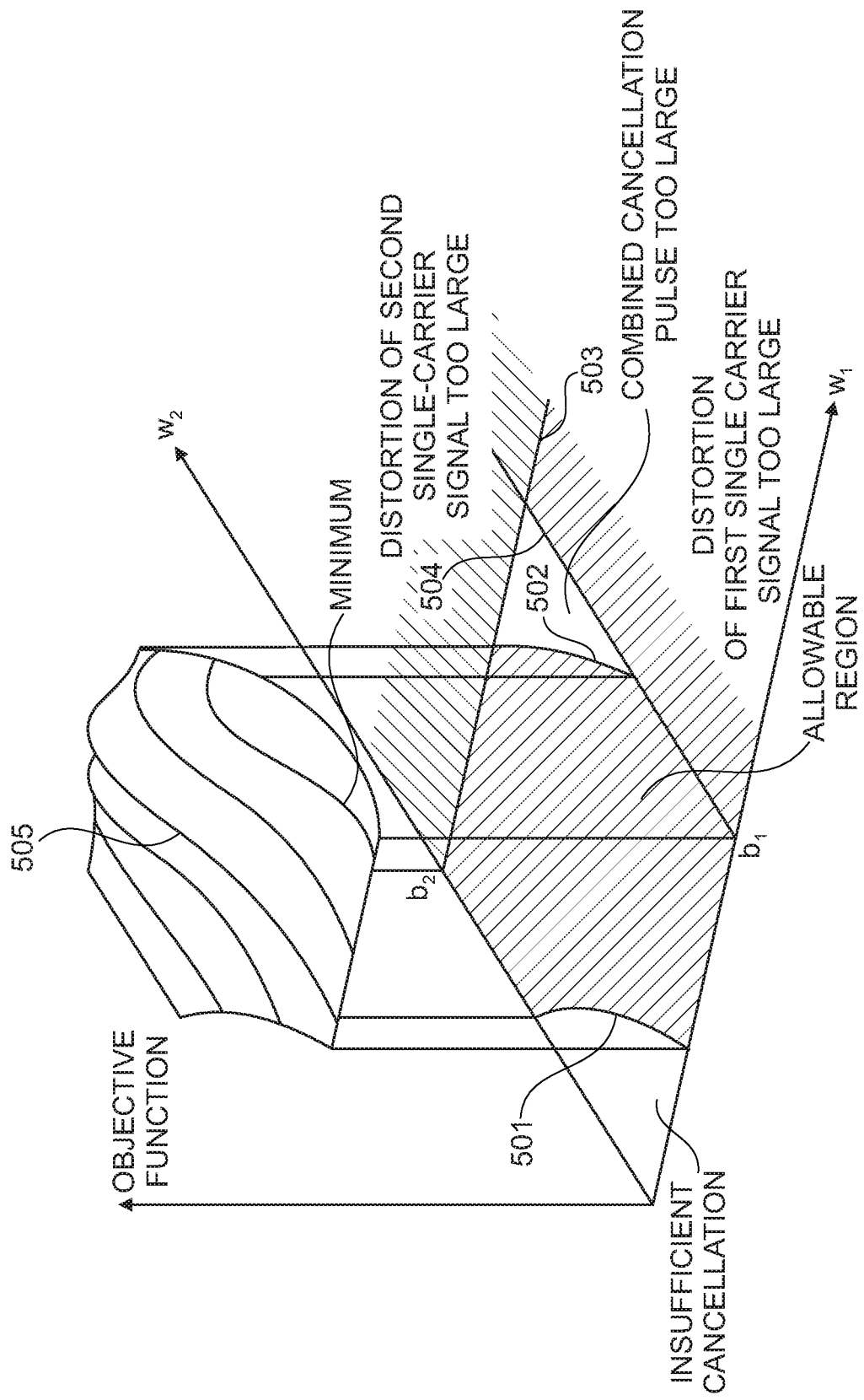
FIG. 5 illustrates the concept of a convex optimisation in the context of this disclosure.

FIG. 5 illustrates the concept of the convex optimisation applied to the crest factor reduction. For the purpose of FIG. 5, a simplified situation with only two single-carrier signals and two weighting factors $w_1$ and $w_2$ is contemplated. FIG. 5 shows a three-dimensional graph comprising a $w_1$, $w_2$-plane and an axis for the values of the objective function at the points $(w_1, w_2)$ in the $w_1$, $w_2$-plane. The objective function is represented by a surface 505. The aim is to find a point in the $w_1$, $w_2$-plane, where the objective function has a minimum or a sufficiently small value which would mean that the distortion of the multi-carrier signal is as low as possible or already sufficiently small, respectively. The process of convex optimization is subject to a number of boundary conditions that are schematically illustrated in FIG. 5. A first boundary condition is indicated by a curve 501 in the $w_1$, $w_2$-plane. The purpose of the crest factor reduction is to achieve a sufficiently small crest factor. Under certain circumstances this can only be achieved by applying cancellation pulses to the multi-carrier signal that have a sufficient strength in order to compensate for any peak occurring in the multi-carrier signal. In the contrary case, the compensation is insufficient. This may be the case in a region close to the origin of the $w_1$, $w_2$-plane. On the other hand, it is also possible that the combined cancellation pulse becomes too large. A combined cancellation pulse that is too large could lead to an over-compensation of the peak in the multi-carrier signal and thus the creation of another peak in the multi-carrier signal with an inversed sign. It is also possible that the distortion of the multi-carrier signal becomes too large if a large combined cancellation pulse is applied. The boundary at which the combined cancellation pulse because too large is shown at the curve 502 in FIG. 5.

As already mentioned in the context of FIG. 4, the single-carrier-specific distortions should not exceed certain threshold values $\epsilon_i$. In FIG. 5 this is shown by two straight lines 503, 504 at $b_1$ for the weighting factor $w_1$, and by $b_2$ for the weighting factor $w_2$.

These boundaries and the axes of the $w_1$, $w_2$-plane define an allowable region for ($w_1$, $w_2$) value pairs.

Figure 6:
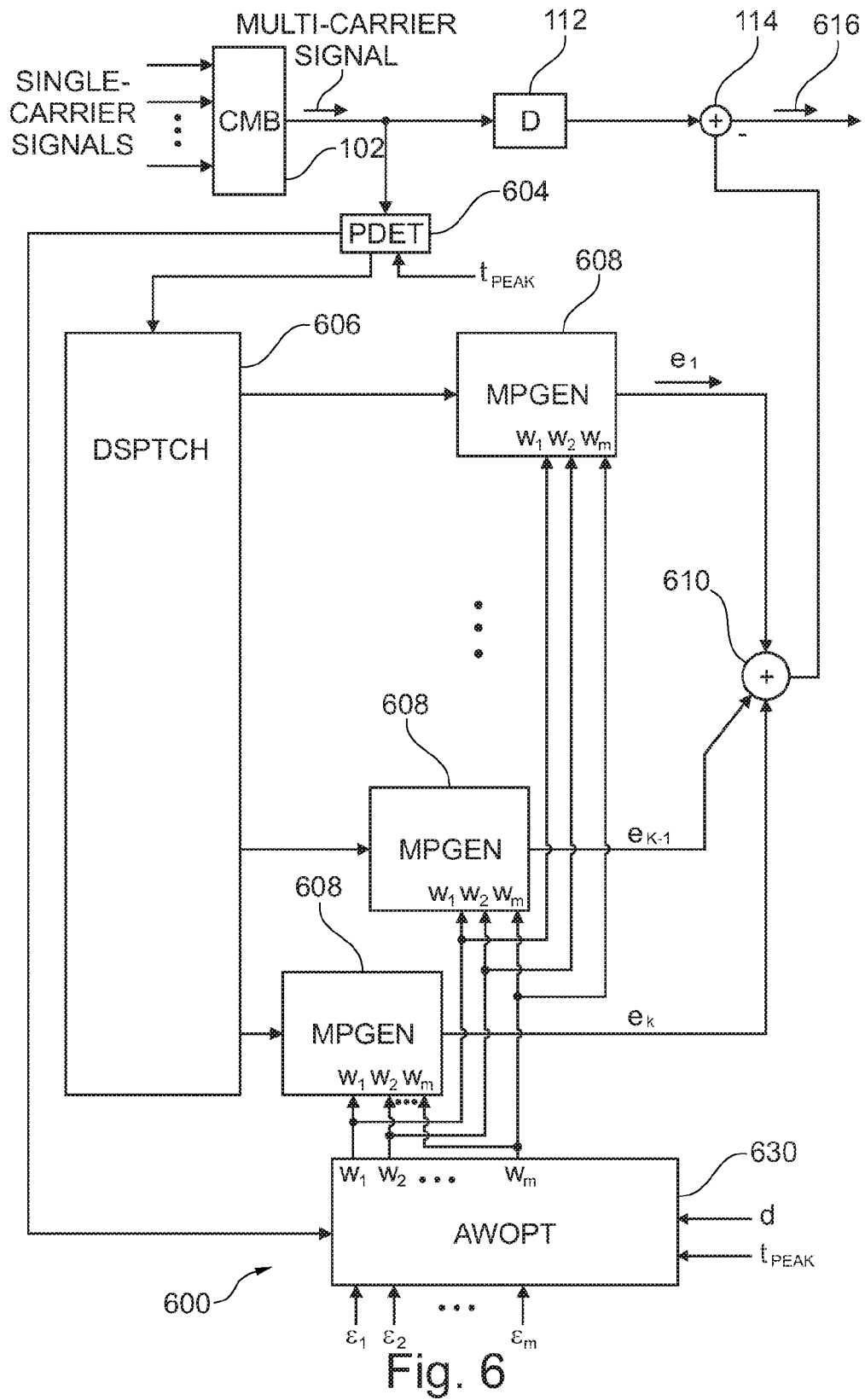
FIG. 6 shows a schematic block diagram of a crest factor reduction circuit according to the teachings disclosed herein.
Figure 7:
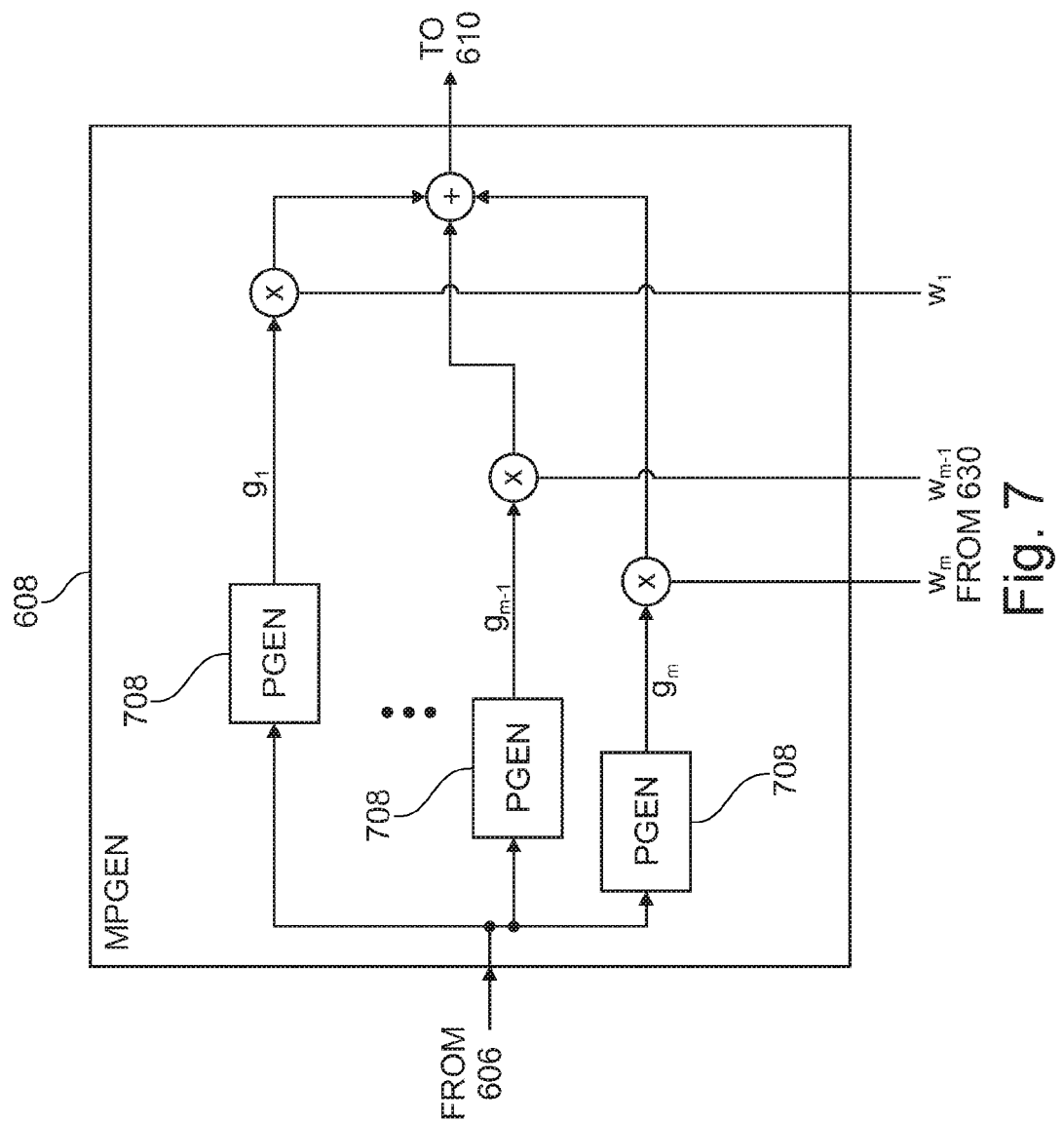
FIG. 7 shows a schematic block diagram of a multi-pulse generator.

FIG. 6 shows a schematic block diagram of a crest factor reduction circuit according to the teachings disclosed herein. A plurality of single-carrier signals is provided as input to a combiner 102 (CMB) which forms a multi-carrier signal by combining the plurality of single-carrier signals. The multi-carrier signal then follows a main signal processing path and also a crest factor reduction path. The main signal processing path comprises a delay element 112 (D) and ends at an adder 114. The crest factor reduction path comprises a peak detector 604 (PDET). The peak detector 604 takes the amplitude threshold $t_{peak}$ and finds signal intervals in which the absolute amplitude of the multi-carrier signal x exceeds this amplitude threshold. Within such intervals, a peak is detected by finding the position with the largest absolute signal amplitude. In the alternative, it is also possible that the peak detector 604 analyses the multi-carrier signal once per sampling time. The peak detector 604 is connected to a pulse dispatcher 606 (DSPTCH) and transmits information about detected peaks to the pulse dispatcher 606 via the connection. The pulse dispatcher 606 selects an available pulse generator resource from a pulse generator battery and triggers the pulse generator to generate a cancellation pulse for the multi-carrier signal. If all of the pulse generator resources are occupied, then a specific potential pulse cannot be canceled. If this happens, the affected potential pulse will presumably be canceled in one of the next durations, provided that the parameters of the overall crest factor reduction system are chosen appropriately. The pulse generator resources are in the case of FIG. 6 multi-pulse generators 608 (MPGEN). The crest factor reduction circuit shown in FIG. 6 comprises k multi-pulse generators 608 which form the pulse generator battery. The multi-pulse generators 608 can be considered as a generalization of the pulse generator block of the standard scheme depicted in FIG. 1. It consists of m pulse generators, the output signals of which are weighted by complex weights $w_1, w_2, \ldots, w_m$ prior to adding them together into a single-pulse cancellation signal. A block diagram of such a multi-pulse generator is depicted in FIG. 7.

Each multi-pulse generator 608 of the plurality of multi-pulse generators 608 receives the plurality of weighting factors $w_1, \ldots, w_m$ from an adaptive pulse weight optimizer 630 (AWOPT). The adaptive pulse weight optimizer 630 may be implemented by reformulating the optimization problem into a convex optimization problem, and then using well-known techniques for finding the optimum solution for this class of problems (see FIGS. 4 and 5 and the corresponding description). The result of this convex optimization is the set of complex weights $w_1, w_2, \ldots w_m$, which are applied to one of the multi-pulse generators 608 that has been chosen by the pulse dispatchers 606. The convex optimization problem may be formulated e.g. as described in the following.

Define the complex variables
a. d,
b. $w_1, \ldots, w_m$
c. y
d. $e_1, \ldots, e_m$.

The variable d is the distortion of the multi-carrier signal caused by the crest factor reduction and can be expressed by means of a suitable norm of the combined cancellation pulse:

$$\left\| \sum_{i=1}^{m} e_i \right\| \leq d.$$

The variable y represents the crest factor reduced multi-carrier signal and may be expressed as $$y = x + \sum_{i=1}^{m} e_i.$$

The convex optimization may be subject to one or more auxiliary conditions, the amplitude of the crest factor reduced signal $y_{peak}$ at the temporal position of the potential peak should be smaller than the amplitude threshold $t_{peak}$:

$$y_{peak} \leq t_{peak}$$

Each one of the plurality of cancellation pulses with single-carrier signal-specific spectral properties should not be too strong in order to avoid excessive distortion within one of the single-carrier signals. This may be expressed by the formula $$|e_i|^2 \leq \epsilon_i \text{ for each pulse generator } i=1, \ldots, m$$

It should be noted that two or more successive cancellation pulses could superpose each other, especially when they are triggered in a relatively rapid succession.

These residues of an earlier activated cancellation pulses are represented by the variable z so that the formula for a cancellation pulse is:

$$e_i = w_i \cdot g_i^l + z_t$$

As can be seen in FIG. 6, the single-carrier signal-specific threshold values $\epsilon_1, \ldots \epsilon_m$ are provided to the adaptive pulse weight optimizer 630. These single-carrier single specific threshold values may be subject to modifications during the operation of the crest factor reduction circuit. Also supplied to the adaptive pulse weight optimizer 630 are the allowable overall distortion d for the multi-carrier signal and the amplitude threshold value $t_{peak}$ for a comparison with a current value of the crest-factor-reduced multi-carrier signal or a version thereof that has been estimated by the adaptive pulse weight optimizer 630. The adaptive pulse weight optimizer 630 also receives information from the pulse detector 604, such as the amplitude of the potential peak in the multi-carrier signal.

The selected one of the plurality of multi-pulse generators 608 receives information required for the generation of the cancellation pulses from the pulse dispatcher 606 and the adaptive pulse weight optimizer 630. The selected multi-pulse generator 608 produces a combined cancellation pulse $e_i$ which is sent to an adder or signal combiner 610. The adder 610 combines the combined cancellation pulses produced by the battery of multi-pulse generators 608. The combined cancellation pulse (possibly superposed with previous or successive cancellation pulses) is then sent to the signal adder 114 where the combined cancellation pulse is subtracted from the multi-carrier signal that has been transmitted via the main signal processing path including the delay element 112. The delay element 112 appropriately chosen so that at the adder 114 the potential peak in the multi-carrier signal coincides with the combined cancellation pulse produced by the cancellation pulse path of the crest factor reduction circuit 600. A crest factor-reduced multi-carrier signal 616 then leaves the crest factor reduction circuit 600.

FIG. 7 shows a multi-pulse generator 608. The multi-pulse generator 608 comprises m pulse generators 708, the output signals of which are weighted by the complex weights $w_1, w_2, \ldots, w_m$, prior to adding them together into a single pulse cancellation signal.

When triggered by the pulse dispatcher 606, each one of the pulse generators 708 creates a suitable cancellation pulse, whose spectral properties match with the spectral properties of the corresponding single-carrier signal to which the pulse generator 708 is assigned. Technically, the pulse generator 708 may be implemented as a programmable digital circuit which allows flexible reconfiguration and adaption to different signals, e.g. different carrier signals for different mobile radio standards. The pulses generated by the pulse generators 708 are normalized in an appropriate way such that scaled by the complex weights $w_1, w_2, \ldots w_m$, the contributions of the individual single-carrier signal to the peak of the multi-carrier signal is reduced in such a way that peak power reduction is achieved without violating the specific requirements on the signal quality, whenever possible. The complex weights $w_1, w_2, \ldots, w_m$ are provided to the multi-pulse generator 608 by the adaptive pulse weight optimizer 630. After the cancellation pulses have been weighted with the complex weights, they are combined to form a combined cancellation pulse which is then transmitted to the signal combiner 610 shown in FIG. 6.

Figure 8:
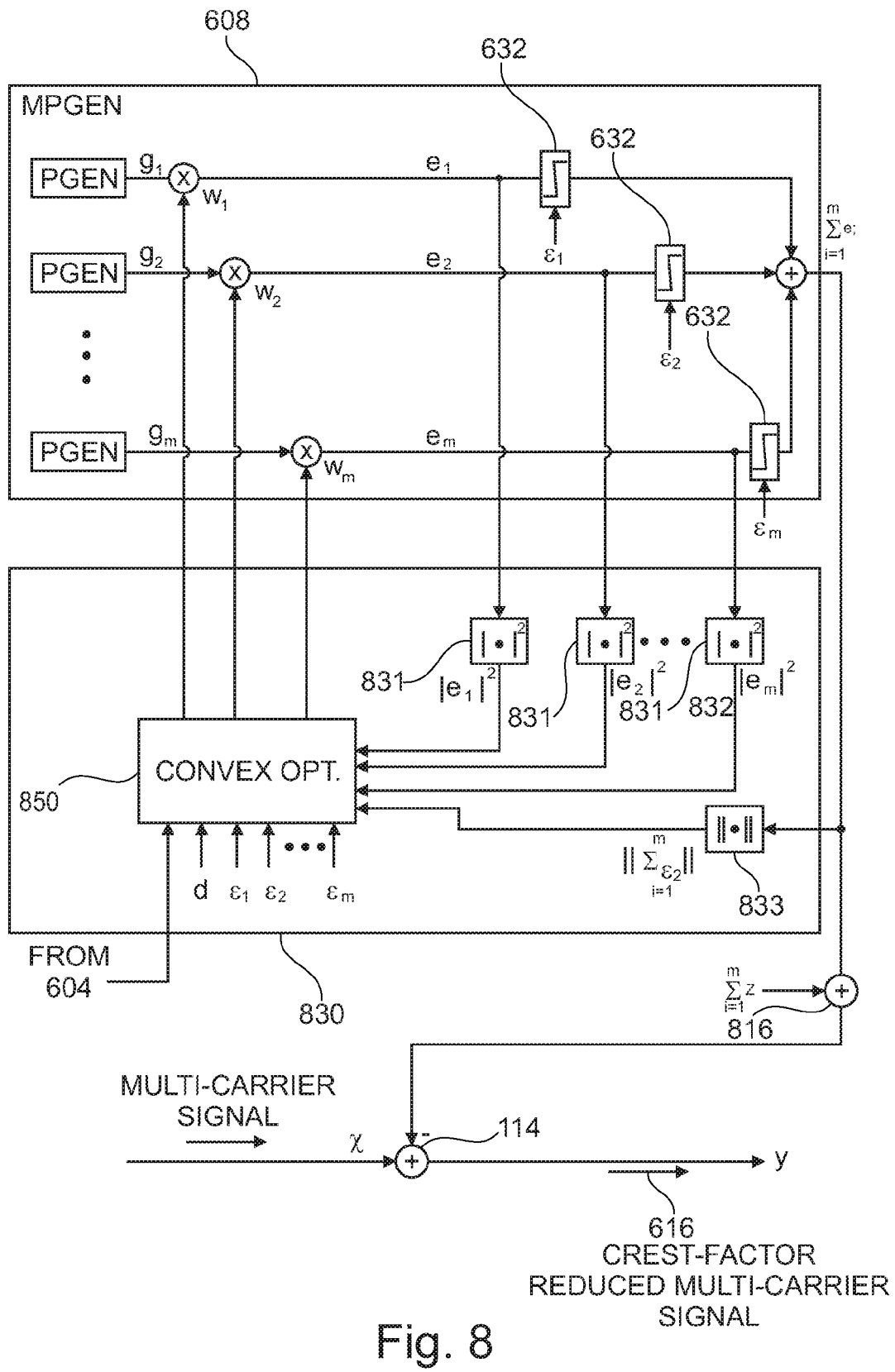
FIG. 8 shows a block diagram of a variant of a multi-pulse generator and an adaptive pulse weight optimizer.

FIG. 8 shows a schematic block diagram of a multi-pulse generator 608 and an adaptive pulse weight optimizer 830. The basic structure of the multi-pulse generator 608 has already been shown in FIG. 7. The output signal of the multi-pulse generator 608 is distributed to the adaptive pulse weight optimizer 830 and to a signal combiner 816. At the signal combiner 816, previous signal distortions due to multi-pulse generators 608, which have been activated in the past, but are still active, are injected to the combined cancellation pulse. As such, the sum of previously signal distortions $z_i$ comes from one or more of the other multi-pulse generators 608. The combined signal at the output of the signal combiner 816 is then provided to the signal combiner 114 where it is injected to the multi-carrier signal x. The crest-factor reduced multi-carrier signal 616 (y) is available at the output of the signal combiner 114.

The adaptive pulse weight optimizer 830 comprises a convex optimization module 850 which determines values for the complex weights $w_1, \ldots w_m$ on the basis of an optimization strategy. To this end, the convex optimization module receives various input signals on the basis of which the performance of the convex optimization and of the crest factor reduction may be evaluated. The plurality of cancellation pulses $e_1, \ldots e_m$ is tapped within the multi-pulse generator 608 and provided to the adaptive pulse weight optimizer 830. The cancellation pulses $e_1 \ldots e_m$ are evaluated by blocks 831 to determine a norm of the cancellation pulses $e_1, \ldots e_m$. In the implementation of FIG. 8, this norm is chosen to be the $L^2$-norm, which is then provided to the convex optimization module 850. In a similar manner a norm-calculating block 833 determines a norm of the combined cancellation pulse and supplies it to the convex optimization module 850. Further input parameters to the convex optimization module 850 are the distortion threshold d and the single-carrier distortion thresholds $\epsilon_1, \ldots \epsilon_m$.

The single-carrier distortion threshold values $\epsilon_1, \ldots \epsilon_m$ are also used within the multi-pulse generator 608 in order to limit the cancellation pulses so that the cancellation pulses do not cause a distortion to the single-carrier signals in excess of the corresponding one of the plurality of single-carrier distortion thresholds $\epsilon_1, \ldots \epsilon_m$. The convex optimization module 850 knows about the constraints imposed by distortion threshold $\epsilon_1, \ldots \epsilon_m$ and may thus take these constraints into account during the optimizing of the weight factors $w_1, \ldots w_m$.

Figure 9:
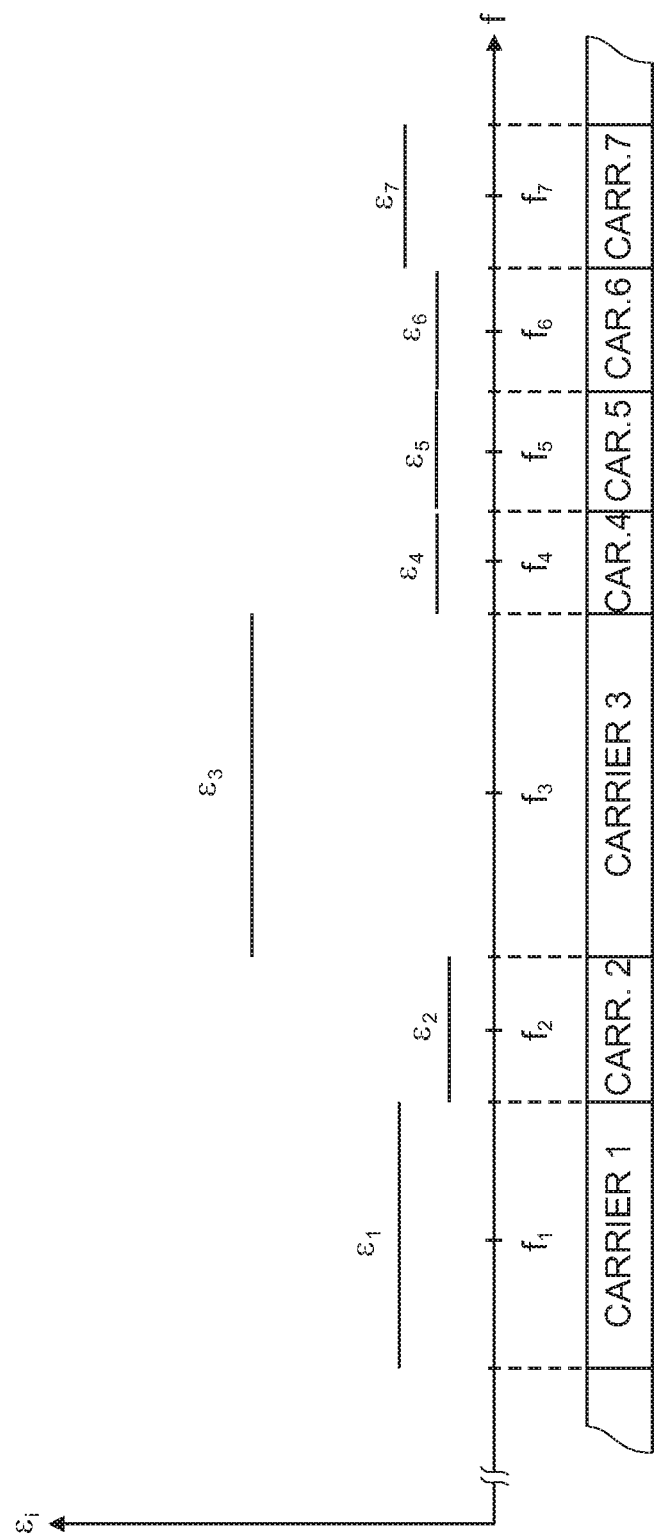
FIG. 9 shows a diagram of thresholds for allowable distortion as a function of carrier frequency.

FIG. 9 shows an exemplary distribution of single-carrier signal distortion threshold values $\epsilon_1, \ldots \epsilon_7$ over a frequency range occupied by the multi-carrier signal. The frequency range occupied by the multi-carrier signal is sub-divided into seven sub-ranges, the number seven being purely exemplary, i.e. there could be as little as two sub-ranges or a larger number of sub-ranges. Each one of the plurality of sub-ranges is assigned to a single-carrier signal which typically has a center frequency $f_1, \ldots f_7$. The various sub-ranges may have different sizes that reflect that different ones of the plurality of single-carrier signals may have different bandwidths. For example, the single-carrier signal at the center frequency $f_3$ has a relatively large bandwidth as it would be required for e.g. an UMTS signal. The three single-carrier signals at center frequencies $f_4$, $f_5$, and $f_6$ have relatively narrow bandwidths and one can imagine these single-carrier signals to be GSM signals.

FIG. 9 illustrates how the single-carrier distortion thresholds $\epsilon_1, \ldots \epsilon_7$ are chosen as a function of the single-carrier signal to which the single-carrier distortion threshold shall be applied. For example, a single-carrier distortion threshold $\epsilon_3$ has a relatively high value indicating that the single-carrier signal at center frequency $f_3$ is assumed to support a relatively large amount of distortion caused by the crest factor reduction. On the other hand, the single-carrier distortion thresholds $\epsilon_4$ to $\epsilon_6$ have relatively low values which indicates to the adaptive pulse weight optimizer 630 or 830 that the single-carrier signals at the corresponding center frequencies $f_4$ to $f_6$ should not be burdened with cancellation pulses that are too strong.

The plurality of single-carrier distortion threshold values $\epsilon_1, \ldots \epsilon_m$ may be time-variable so that an adjustment is possible depending on for example a current level of utilization of a channel occupied by one of the plurality of single-carrier signals. Another strategy could be to look for channels in which payload signals with a large amplitude are transmitted and to distribute a relatively large amount of the power of the combined cancellation pulse to these single-carrier signals, since these single-carrier signals are mainly responsible for an instantaneously high value of the crest factor of the multi-carrier signal.

While various embodiments of the present invention have been described above, it should be understood that they have been presented by way of examples, and not limitation. It will be apparent to persons skilled in the relevant art that various changes in form and detail can be made therein without departing from the scope of the invention. In addition to using hardware (e.g. within or coupled to a central processing unit (CPU), microprocessor, microcontroller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer useable (e.g. readable) medium configured to store the software. Such software can enable, for example, the function, fabrication, modelling, simulation, description and/or testing of the circuits and methods described herein. For example, this can be accomplished through the use of general program languages (e.g. C, C++), hardware description languages (HDL) including Verilog, HDL, VHDL, etc., or other available programs. Such software can be disposed in any known non-transitory computer useable medium such as semiconductor, magnetic disk, or optical disk (e.g. CD-ROM, DVD-ROM, etc.) The software can also be disposed as computer data embodied in a non-transitory computer useable (e.g. readable) transmission medium (e.g. solid state memory and other non-transitory medium including digital, optical, analogue base medium such as removable storage media). Embodiments of the present invention may include methods of providing the circuit described herein by providing software describing the apparatus and subsequently transmitting the software as a computer data signal over a communication network including the internet and intranet.

It is understood that the circuit and method described herein may be included in a semiconductor intellectual property core, such as a microprocessor core (e.g. embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A method for crest factor reduction of a multi-carrier signal comprising a plurality of single-carrier signals, each single-carrier signal of the plurality of single-carrier signals having signal-specific spectral properties, the method comprising:
    identifying a peak in the multi-carrier signal and a time of occurrence of the peak;
    generating a plurality of cancellation pulses depending on the time of occurrence of the peak, wherein a particular cancellation pulse of the plurality of cancellation pulses is associated with a particular single-carrier signal of the plurality of single-carrier signals and wherein cancellation pulse-specific spectral properties of the particular cancellation pulse substantially match the signal-specific spectral properties of the associated particular single-carrier signal;
    combining the plurality of cancellation pulses to form a combined cancellation pulse;
    applying the combined cancellation pulse to the multi-carrier signal to reduce the peak;
    weighting the plurality of cancellation pulses with a plurality of weighting factors prior to combining the plurality of cancellation pulses; and
    adjusting the weighting factors depending on a plurality of variable distortion thresholds for the plurality of single-carrier signals, each variable distortion threshold of the plurality of variable distortion thresholds defining an allowable range of operation for one of the plurality of single-carrier signals with respect to distortions.

2. The method of claim 1, wherein the adjusting comprises an optimization of the weighting factors based on evaluating and minimizing a crest factor reduction distortion of the multi-carrier signal caused by the crest factor reduction.

3. The method of claim 2, wherein the optimization is a convex optimisation.

4. The method of claim 1, wherein two or more successive ones of the combined cancellation pulses are generated by two or more different pulse generators of a crest factor reduction circuit performing the method for crest factor reduction.

5. The method of claim 1, wherein the identifying the peak also produces at least one of a value of a peak amplitude of the peak and a peak phase of the peak, and wherein the generating the plurality of cancellation pulses depends on at least one of the peak amplitude.

6. A crest factor reduction circuit for a multi-carrier signal comprising a plurality of single-carrier signals, each single-carrier signal of the plurality of single-carrier signals having signal-specific spectral properties, the crest factor reduction circuit comprising:
    a peak detector for identifying a peak in the multi-carrier signal and a time of occurrence of the peak;
    a multi-pulse generator for generating a plurality of cancellation pulses depending on the time of occurrence, the multi-pulse generator comprising a plurality of pulse generators and a cancellation pulse combiner connected to a pulse output of the plurality of pulse generators and adapted to form a combined cancellation pulse, wherein a particular pulse generator of the plurality of pulse generators is associated with a particular single-carrier signal of the plurality of single-carrier signals and wherein cancellation pulse-specific spectral properties of a cancellation pulse generated by the particular pulse generator substantially match the signal-specific spectral properties of the associated particular single-carrier signal;
    a pulse injector for injecting the combined cancellation pulse to the multi-carrier signal;
    a weighting unit interposed between the plurality of pulse generators and the cancellation pulse combiner, the weighting unit being adapted to weight the plurality of cancellation pulses with a plurality of weighing factors prior to the combining the plurality of cancellation pulses; and
    an adaptive adjuster adapted to adjust the weighting factors depending on a plurality of variable distortion thresholds for the plurality of single-carrier signals.

7. The crest factor reduction circuit of claim 6, wherein the adaptive adjuster is adapted to perform an optimization of the weighting factors based on evaluating and minimizing a crest factor reduction distortion of the multi-carrier signal caused by the crest factor reduction.

8. The crest factor reduction circuit of claim 6, comprising a plurality of the multi-pulse generators, the plurality of the multi-pulse generators being adapted to generate a plurality of combined cancellation pulses in a staggered succession.

9. The crest factor reduction circuit of claim 6, wherein the identifying the peak detector produces at least one of a value of a peak amplitude of the peak and a peak phase of the peak, and wherein the multi-pulse generator is adapted to generate the plurality of cancellation pulses depending on at least one of the peak amplitude and the peak phase.

10. A mobile communications transmitter comprising a crest factor reduction circuit according to claim 6.

11. A mobile communications base station comprising a crest factor reduction circuit according to claim 6.

12. A computer program product comprising a non-transitory computer-usable medium having control logic stored therein for causing processor to execute a method for crest factor reduction of a multi-carrier signal comprising a plurality of single-carrier signals, each single-carrier signal of the plurality of single-carrier signals having signal-specific spectral properties, the method comprising:

identifying a peak in the multi-carrier signal and a time of occurrence of the peak;

generating a plurality of cancellation pulses depending on the time of occurrence of the peak, wherein a particular cancellation pulse of the plurality of cancellation pulses is associated with a particular single-carrier signal of the plurality of single-carrier signals and wherein cancellation pulse-specific spectral properties of the particular cancellation pulse substantially match the signal-specific spectral properties of the associated particular single-carrier signal;

combining the plurality of cancellation pulses to form a combined cancellation pulse;

applying the combined cancellation pulse to the multi-carrier signal to reduce the peak; and weighting the plurality of cancellation pulses with a plurality of weighting factors prior to combining the plurality of cancellation pulses; and adjusting the weighting factors depending on a plurality of variable distortion thresholds for the plurality of single-carrier signals, each variable distortion threshold of the plurality of variable distortion thresholds defining an allowable range of operation for one of the plurality of single-carrier signals with respect to distortions.

13. A computer program product comprising a non-transitory computer-usable medium having control logic stored therein for causing a computer to manufacture a crest factor reduction circuit comprising:

a peak detector for identifying a peak in the multi-carrier signal and a time of occurrence of the peak;

a multi-pulse generator for generating a plurality of cancellation pulses depending on the time of occurrence, the multi-pulse generator comprising a plurality of pulse generators and a cancellation pulse combiner connected to a pulse output of the plurality of pulse generators and adapted to form a combined cancellation pulse, wherein a particular pulse generator of the plurality of pulse generators is associated with a particular single-carrier signal of the plurality of single-carrier signals and wherein cancellation pulse-specific spectral properties of a cancellation pulse generated by the particular pulse generator substantially match the signal-specific spectral properties of the associated particular single-carrier signal;

a pulse injector for injecting the combined cancellation pulse to the multi-carrier signal;

a weighting unit interposed between the plurality of pulse generators and the cancellation pulse combiner, the weighting unit being adapted to weight the plurality of cancellation pulses with a plurality of weighing factors prior to the combining the plurality of cancellation pulses; and an adaptive adjuster adapted to adjust the weighting factors depending on a plurality of variable distortion thresholds for the plurality of single-carrier signals.

* * * * *